United States Patent Office 3,515,696
Patented June 2, 1970

3,515,696
POLYESTERS FROM HYDROXYALKOXYBEN-
ZOIC ACIDS, POLYOLS AND POLYCARBOX-
YLIC ACIDS
Takaakira Tsuji and Kenichi Tanabe, Kurashiki, Japan, assignors to Kurashiki Rayon Company Limited, Kurashiki, Japan, a corporation of Japan
No Drawing. Filed Aug. 7, 1964, Ser. No. 388,325
Claims priority, application Japan, Aug. 16, 1963, 38/43,244
Int. Cl. C08g 17/08
U.S. Cl. 260—47                                    6 Claims

ABSTRACT OF THE DISCLOSURE

Method of manufacturing high molecular weight polyesters which comprises polycondensating an aromatic hydroxycarboxylic acid (A), a hydroxy compound (B) and a carboxyl compound (C), wherein (B) and/or (C) is a compound having at least three functional groups.

---

This invention relates to a method of manufacturing high molecular weight polyesters from aromatic hydroxycarboxylic acid which comprises polycondensing aromatic hydroxycarboxylic acid expressed by the following general formula

or

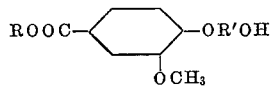
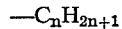

wherein R represents alkyl radicals expressed by

—$C_nH_{2n+1}$ and R' represents polymethylene radicals expressed by —$(CH_2)_n$— and $n$ is an integer, by adding compounds of bifunctionality or more containing hydroxyl group or derivative groups thereof and also adding compounds of bifunctionality or more containing carboxylic acid or derivatives thereof at least one of said compounds having trifunctionality or more.

The principal object of the invention is to provide polyesters of high molecular weight having no coloration in comparison with polyesters consisting of aromatic hydroxycarboxylic acid only by using various kinds of catalysts and by polycondensation of a shorter reaction time and also to provide polyesters for making fibers and other shaped articles having excellent dyeability and elasticity.

It has already been known in the art to manufacture polyesters by polycondensating aromatic hydroxycarboxylic aid or esters thereof. On the other hand, however, the reaction rate of aromatic hydroxycarboxylic acid is slower than that of dicarboxylic acid and diol and moreover, it is liable to be considerably colored due to the fact that the ether bond directly coupled to aromatic nucleus is distintegrated during the reaction to form phenolic -OH or owing to the phenols existing as impurities in the monomer. If a catalyst for the manufacture of polyethylene terephthalate from dimethyl terephthalate and ethylene glycol, as for instance, is used, high molecular weight polyesters can never be obtained even when a considerably long time has been spent and moreover, the polymer is colored owing to the long duration of reaction. Moreover, in case of using catalyst for providing high molecular weight polyesters there are many polymers which are considerably colored during the period of polycondensation forming high molecular weight polyesters, so that it has been very difficult to obtain colorless high molecular weight polyesters.

For the manufacture of high molecular weight polyesters, such a method of adding compounds containing 3 or more ester-forming groups as chain branching agent has been known. For instance, in case of manufacturing polyethylene terephthalate from dimethyl terephthalate and ethylene glycol, high molecular weight branched polyester can be obtained by using excess amount of ethylene glycol, and by adding thereto pentaerythritol to effect ester-interchange reaction, then while eliminating excessive ethylene glycol to effect polycondensation.

On the other hand, hydroxycarboxylic acid as the monomer has a hydroxyl group and a carboxyl group in one molecule, so addition of pentaerythritol results in excess of hydroxyl group corresponding to it.

As it is impossible to exclude hydroxyl group only out of the reaction system, effect of increasing molecular weight by branching is cancelled by the existence of excessive hydroxyl group.

As a result of investigations to obviate such difficulties the inventors have found out that high molecular weight polyesters can be obtained by adding a compound having trifunctionality or more and by adding a compound having two or more functional groups which can produce ester bond by reacting with functional groups contained in the compound of trifunctionality or more in order to compensate the excessive ester-forming radical of a compound having trifunctionality or more.

The effect of the invention lies in the possibility of using a catalyst which would be difficult to obtain polyesters from aromatic hydroxycarboxylic acid and also in shortening the reaction time to obtain high molecular weight polyester, accordingly, the catalyst can be selected over a wide range and also owing to the short reacting time it enables to obtain non-coloring polyesters. Further unexpected effect is that it enables to manufacture polyesters for manufacturing fibers and other shaped articles having excellent dyeability and elasticity.

As the aromatic hydroxycarboxylic acid to be used in the method of the invention is one or more of aromatic hydroxycarboxylic acids expressed by the following general formula

or

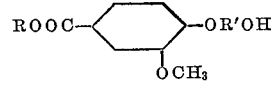

wherein R represents alkyl group expressed by —$C_nH_{2n+1}$, R' is polymethylene group expressed by —$(CH_2)_n$— and also those modified by monomethoxy polyethylene glycol, styrene-methylmethacrylate copolymer and the like other material can be used.

As bifunctional compounds containing hydroxyl groups or its derivative groups to be used in the invention, use is made of any monomer used for the synthesis of linear polyesters, that is, ethylene glycol, propylene glycol, tetramethylene glycol, diethylene glycol, triethylene glycol, 1,4-cyclohexane dimethanol, hydroquinone, catechol, resorcinol, 2,2-bis(4-hydroxyphenyl)propane, 2,2-bis(4-(β-hydroxyethoxy)phenyl)propane. In case of cocondensating the added diol quantitatively into polyester, non-volatile substances or difficult-to-volatile substances in the condition of polyester synthesis are used preferably. As the compounds of trifunctionality or more containing hydroxyl groups or derivatives thereof, trifunctional compounds such as glycerol and tetrafunctional compounds such as pentaerythritol and also polyfunctional compounds such as phenol-formaldehyde resins, which can be used as merchandise and greater number expresses larger degree of coloring.

| | Number | | | | | | | | | | |
|---|---|---|---|---|---|---|---|---|---|---|---|
| | 1 | 2 | 3 | 4 | 5 | 6 | 7 | 8 | 9 | 10 | 11 |
| Catalyst | Zinc acetate, antimonium oxide | Zinc acetate, antimonium oxide | Zinc acetate, antimonium oxide | Zinc acetate, antimonium oxide | Zinc acetate, antimonium oxide | Zinc acetate, antimonium oxide | Zinc acetate, antimonium oxide | Lead monoxide | Lead monoxide | Lead monoxide | Lead monoxide (0.025 part) |
| Pentaerythritol (mol percent/EOBM) | 0 | 0.5 | 1.0 | 0 | 0.5 | 0.5 | 0.5 | 0 | 0.2 | 0.5 | 0.5 |
| Dimethyl adipate (mol percent/EOBM) | 0 | 0 | 0 | 1.0 | 0.5 | 1.0 | 2.0 | 0 | 0.4 | 1.0 | 0.5 |
| Reaction time under pressure less than 1 mm. Hg (hr.) | 5 | 5 | 5 | 5 | 5 | 5 | 5 | 5 | 3 | 2 | 4 |
| ($\eta$) (dl./g.) | 0.37 | 0.39 | 0.36 | 0.32 | 0.54 | 0.63 | 0.61 | 0.57 | 0.63 | 0.65 | 0.64 |
| Degree of coloring | 0 | 1 | 0 | 0 | 0 | 0 | 1 | 5 | 4 | 2 | 2 | p-cresol-formaldehyde resin and polyvinyl acetate may be used.

The bifunctional compounds containing carboxyl group or derivative thereof to be used for the invention are any monomer to be used for the synthesis of linear polyester, that is, terephthalic acid, isophthalic acid, phthalic acid, adipic acid, sebacic acid or alkyl esters thereof. As the compounds of trifunctionality or more containing carboxylic group or derivatives thereof, use is made of trifunctional compounds such as methyl propane-1,2,3-tricarboxylate trimethyl trimesate and tetrafunctional compounds such as methyl propane-1,1,2,2-tetracarboxylate and also polyfunctional compounds such as polymethyl acrylate, styrene-acrylic acid copolymers.

The amount of compound of trifunctionality or more to be used for the invention may be freely selected, but when a shaped article such as filament is manufactured the addition of such quantity as 0.05 to 4.0 mol percent based on the aromatic hydroxycarboxylic acid to take part of branching is preferable. Moreover, the compounds of bifunctionality or more to be added for compensating the ester-forming group which became excess by the addition of compounds of trifunctionality or more may be added to such amount that its ester-forming group should become 30 to 300% based on the number of ester-forming groups of the latter compounds and about 100% is naturally preferable. The high molecular weight polyester from aromatic hydroxycarboxylic acid of the invention can be used for the manufacture of filaments, films, shaped articles and painting material.

The invention will be further explained in detail with reference to the examples.

EXAMPLE 1

150 weight parts of methyl β-hydroxyethoxy benzoate (abridged as EOBM hereafter) (all parts hereinafter are expressed by weight) and a definite quantity of pentaerythritol and dimethyl adipate together with a catalyst selected from the group consisting of a mixed catalyst of 0.075 part of zinc acetate and 0.038 part of antimonium oxide, and 0.075 part of lead monoxide were heated in a reaction tube at 85° C. by introducing nitrogen for 3 hours, succeedingly for 1 hour at 200° C., then further at 250° C. for 1 hour to effect ester interchange reaction. Then the reaction mixture is subjected by heating to polycondensation under a reduced pressure of 20 to 30 mm. Hg at 250° C. for ½ hour and then for a predetermined time at 250° C. under a reduced pressure less than 1 mm. Hg. Polyesters as shown in the next table were obtained, wherein the degree of polymerization was expressed by the value of intrinsic viscosity [$\eta$] measured in a mixed solvent consisting of 50 parts of ethane tetrachloride and 50 parts of phenol at 30° C. Further, coloring degree of polymer is expressed by number, that is, zero expresses perfectly white color and 1 expresses nearly white color As apparent from the table, when a mixed catalyst of zinc acetate and antimonium oxide was used substantially no coloration was recognized, but polyesters of high molecular weight could not be obtained and by using pentaerythritol which was usually used as branching agent alone high molecular weight polyester could not be obtained. On the contrary, if dimethyl adipate was added with pentaerythritol according to the invention easily spinnable high molecular weight polyester was obtained.

When lead monoxide is used as catalyst, high molecular weight polyesters can be obtained without using the method of the invention, but the polymers thus obtained are considerably colored. On the contrary, according to the method of the invention the time of polycondensation is reduced and even with the reduced amount of catalyst high molecular weight polyesters can be obtained and the coloration is substantially improved.

Next, the fiber obtained by conventional melt spinning No. 6 of the invention and stretched to about 5 times the length as extruded showed the dry tenacity of 4.6 to 5.2 g./dr. and elongation of 22 to 26%. By dyeing the fiber thus obtained in an aqueous solution containing 4% based on the weight of fiber of disperse dye, trade name Diacelliton Fast Brilliant Blue at 98° C. for 2 hours the fiber was dyed densely, absorbing dye quantity of 33 mg./g.-fiber, whilst the contrast fiber made from No. 8 not belonging to the invention was dyed only to light color. Moreover, elasticity at 3% elongation of the fiber of the invention was 92% against 83% of the contrast fiber not belonging to the invention, so that the fiber of the invention showed superiority in this respect.

EXAMPLE 2

150 parts of methyl β-hydroxyethoxy benzoate added with 0.075 part of zinc stearate as catalyst and 0.4 mol percent of glycerol based on methyl β-hydroxy benzoate and 0.70 mol percent of dimethyl terephthalate were ester-interchanged same as in Example 1, then heated at 250° C. for ½ hour under the reduced pressure of 20 to 30 mm. Hg, further at 250° C. for 5 hours under a reduced pressure of 1 mm. Hg to polycondensate and good white colored polyester having [$\eta$] of 0.58 dl./g. was obtained. The fibers made from the above material in the same manner as in Example 1 showed good dyeability and elasticity.

EXAMPLE 3

80 parts of methyl 3-methoxy-4-β-hydroxy benzoate, 70 parts of methyl β-hydroxyethoxy benzoate and 0.060 part of magnesium oxide as catalyst added with 0.6 mol percent in total of methyl propane-1,2,3-tricarboxylate based on the total weight of methyl 3-methoxy-β-hydroxybenzoate and methyl β-hydroxyethoxy benzoate and 0.9% of 2,2-bis(4-(β - hydroxyethoxy)phenyl)propane were esterinterchanged in the same manner as in Example 1, then heated at 265° C. for ½ hour under a reduced pressure of 20 to 30 mm. Hg, then further at 265° C. for 5 hours under a reduced pressure of less than 1 mm. Hg to polycondensate and good white colored polyester having [η] of 0.60 dl./g. was obtained.

EXAMPLE 4

150 parts of methyl β-hydroxyethoxy benzoate added with 0.075 part of magnesium adipate as catalyst and with addition of 2 parts of polymethylacrylate and 4 parts of hydroquinone were ester-interchanged in the manner as in Example 1 and heated at 250° C. for ½ hour under a reduced pressure of 20 to 30 mm. Hg, then at 250° C. for 8 hours under a reduced pressure of less than 1 mm. Hg to polycondensate and white colored polyester having [η] of 0.58 dl./g. was obtained.

What we claim is:

1. A high molecular weight polyester obtained by polycondensing, under conventional conditions, at least one compound (A) selected from the group consisting of methyl-β-hydroxy-ethoxy benzoate and methyl 3-methoxy-4-β-hydroxy-benzoate, at least one compound (B) selected from the group consisting of ethylene glycol, propylene glycol, tetramethylene glycol, diethylene glycol, triethylene glycol, 1,4-cyclohexane dimethanol, hydroquinone, catechol, resorcinol, 2,2-bis(4-hydroxyphenyl)-propane, 2,2-bis(4-β - hydroxyethoxy phenyl) - propane, glycerol, and pentaerythritol and at least one compound (C) selected from the group consisting of terephthalic acid, isophthalic acid, phthalic acid, adipic acid, sebacic acid and alkyl esters thereof, methyl propane-1,2,3-tricarboxylate, and methyl propane-1,1,2,2-tetracarboxylate provided that at least one of (B) and (C) contains at least three functional groups wherein the amount of the compound having at least three functional groups is from about 0.05 to about 4.0 mol percent based on the amount of (A) and wherein one of (B) and (C) is present in such amount that the number of ester-forming functional groups thereon is 30–300% of the number of ester-forming groups of the other of (B) and (C).

2. A high molecular weight polyester as claimed in claim 1 wherein (B) is at least one compound of the group consisting of glycerol and pentaerythritol and (C) is at least one compound of the group consisting of terephthalic acid, isophthalic acid, phthalic acid, adipic acid, sebacic acid and alkyl esters thereof.

3. A high molecular weight polyester as claimed in claim 1 wherein (B) is at least one compound of the group consisting of ethylene glycol, propylene glycol, tetramethylene glycol, diethylene glycol, triethylene glycol, 1,4-cyclohexane dimethanol, hydroquinone, catechol, resorcinol, 2,2-bis(4-hydroxyphenyl)-propane, 2,2-bis(4-β-hydroxyethoxy phenyl)-propane and (C) is at least one compound of the group consisting of methyl propane-1,2,3-tricarboxylate and methyl propane-1,1,2,2-tetracarboxylate.

4. A high molecular weight polyester as claimed in claim 1 wherein (B) is at least one compound of the group consisting of glycerol and pentaerythritol and (C) is at least one compound of the group consisting of methyl propane-1,2,3-tricarboxylate and methyl propane-1,1,2,2-tetracarboxylate.

5. A high molecular weight polyester as claimed in claim 1 wherein both (B) and (C) contain at least three functional groups.

6. A fiber formed from the polyester of claim 1.

References Cited

UNITED STATES PATENTS

| | | | |
|---|---|---|---|
| 2,471,023 | 5/1949 | Cook et al. | 260—78.3 |
| 2,683,136 | 6/1954 | Higgins | 260—78.3 |
| 2,755,273 | 7/1956 | Bock | 260—47 |
| 2,895,946 | 7/1959 | Huffman | 260—75 |
| 3,033,822 | 5/1962 | Kibler et al. | 260—47 |
| 3,118,935 | 1/1964 | Lynn et al. | 260—530 |

OTHER REFERENCES

Chemical Abstracts, vol. 60, 1964, 9154e and f.

WILLIAM H. SHORT, Primary Examiner

M. GOLDSTEIN, Assistant Examiner

U.S. Cl. X.R.

260—842, 843, 873